(12) United States Patent
Dutoit et al.

(10) Patent No.: US 6,484,586 B1
(45) Date of Patent: Nov. 26, 2002

(54) DIFFERENTIAL PRESSURE TRANSDUCER

(75) Inventors: Bertrand Dutoit, St. Sulpice (CH); Andreas Friedrich, Werdorf (DE); Kurt Hug, Le Landeron; Radivoje Popovic, St. Sulpice, both of (CH)

(73) Assignee: Haenni Instruments AG, Jegenstorf (CH)

( * ) Notice: Subject to any disclaimer, the term of this patent is extended or adjusted under 35 U.S.C. 154(b) by 0 days.

(21) Appl. No.: 09/424,924
(22) PCT Filed: Mar. 31, 1999
(86) PCT No.: PCT/CH99/00136
§ 371 (c)(1), (2), (4) Date: Feb. 14, 2000
(87) PCT Pub. No.: WO99/50633
PCT Pub. Date: Oct. 7, 1999

(30) Foreign Application Priority Data

Apr. 1, 1998 (EP) .............................. 98810282

(51) Int. Cl.$^7$ ................................................ G01L 9/10
(52) U.S. Cl. .............................................. 73/722; 73/728
(58) Field of Search ......................... 73/716 OR, 715, 73/718, 717, 719–728, 756, 724, 722, 706; 361/283, 283.4

(56) References Cited

U.S. PATENT DOCUMENTS

| 3,660,745 A | * | 5/1972 | Bertrand ..................... 318/676 |
| 4,086,815 A | * | 5/1978 | Asano et al. .................. 73/721 |
| 4,388,833 A | * | 6/1983 | Kuwayama ................... 73/718 |
| 4,538,465 A | * | 9/1985 | Bianchi et al. ................ 73/722 |
| 5,760,310 A | * | 6/1998 | Rud, Jr. et al. ............... 73/706 |
| 5,817,943 A | * | 10/1998 | Welles, II et al. ............ 73/718 |

FOREIGN PATENT DOCUMENTS

| DE | 2835523 | 2/1980 |
| DE | 3106835 | 2/1981 |
| GB | 2125167 | 2/1984 |
| WO | 96 41141 | 12/1996 |

OTHER PUBLICATIONS

Vol. 118, No. 7/8, Jul. 1985, pp. 370–372, XP002077500 Bad Worishofen, DE.

* cited by examiner

*Primary Examiner*—Max Noori
(74) *Attorney, Agent, or Firm*—Birch, Stewart, Kolasch & Birch, LLP

(57) ABSTRACT

A differential pressure transducer has a measurement chamber which is divided by a membrane into first and second measurement spaces which can be exposed to first and second pressures whereby differential pressure causes deflection of the membrane from its neutral position. A deflection sensor measures the deflection of the membrane and produces a deflection signal. An electromagnet arrangement produces a magnetic force which compensates for the deflection force which is caused by the differential pressure. The coil current for producing the magnetic compensation force represents a measure of the differential pressure.

26 Claims, 15 Drawing Sheets

DIFFERENTIAL PRESSURE TRANSDUCER

This application is the national phase under 35 U.S.C. §371 of PCT International Application No. PCT/CH99/00136 which has an International filing date of Mar. 31, 1999, which designated the United States of America.

This invention relates to an differential pressure transducer which is especially suited for measuring the differential pressure in a severe industrial environment.

PRIOR ART

A differential pressure transducer is defined as a measurement means for measurement of differential pressure.

Differential pressure transducers are widely used for example in the chemical industry, food industry, aviation industry, in water treatment plants, etc. for purposes of among others flow measurement in flowing media, the control of filters, speed measurement in aircraft or water craft. The necessity of precise measurement of small differential pressures, typically roughly 100 mbar, around a high absolute (conventionally static) pressure of for example 100 bar, has led to development of relatively expensive and complex pressure transducers, since these devices on the one hand must demonstrate their serviceability in the transfer from ambient pressure to high absolute operating pressure and on the other hand must be sensitive enough to be able to measure small differential pressures with the desired accuracy.

WO 96/41141 discloses a pressure transducer in which a measurement membrane of electrically conductive material such as steel divides a measurement chamber into two measurement spaces. The membrane can be exposed to measurement pressures which yield a differential pressure in the two measurement chambers and it is deflected by the differential pressure from its neutral position. In one measurement chamber wall opposite the membrane there is a coil. Relative movements between the coil and membrane are measured via measuring inductance.

In pressure transducers of this type the problem is that, as a result of the elasticity of the measurement membrane, which is linear only in a narrow range, for larger deflections of the measurement membrane there is no longer a linear relationship between the change of the differential pressure and the corresponding change of inductance. Furthermore, there is the danger of inelastic deformations of the membrane which adulterate the measurement results over the long term, for which reason the long term serviceability of the pressure transducer is not ensured. In addition, temperature changes and/or corrosion can significantly change the material properties of the membrane; this can lead to further measurement errors.

DE-A1-31 06 835 describes a differential pressure measurement device which has a measurement chamber which is divided into two measurement spaces by a measurement membrane. The measurement chamber is hermetically sealed against the medium to the outside by means of separation membranes and the differential pressure can be measured in it. To transfer the differential pressure to be measured from the separation membranes to the measurement membrane, the two measurement spaces between the measurement membrane and the respective separation membrane are filled with oil. The measurement membrane in its center has a semiconductor sensor with which the deflection of the measurement membrane from its neutral position is measured. To prevent mechanical overload of the semiconductor sensor there is a compensation device which is coupled via a mechanical connection to the semiconductor sensor and thus the measurement membrane in order to counteract the deflection caused by the differential pressure. In the differential pressure measurement device as claimed in this patent the problem of mechanical overloading of the measurement membrane is reduced.

However, the differential pressure measurement means as claimed in DE-A1-31 06 835, as also otherwise all other known pressure transducers, has a complicated and expensive structure; this makes it unsuited for economical production in large series. At the same time the force of gravity in all known pressure transducers with a measurement membrane represents another error source in that under the influence of gravity the measurement membrane can already be deformed as a result of its inherent weight; this results in an error in pressure measurement which is dependent on the position of the pressure transducer.

DESCRIPTION OF THE INVENTION

The object of this invention is to make available a differential pressure transducer which is structurally simple, which can be economically produced in large series, and which is long-lived and itself enables reliable differential pressure measurements under ambient conditions which are severe with respect to corrosion and temperature.

The differential pressure transducer according to the invention has a measurement chamber which is defined by a housing and which is divided by a membrane device into a first measurement space which can be exposed to a first measurement pressure and a second measurement space which can be exposed to a second measurement pressure. The membrane device comprises at least one measurement membrane, the membrane device being arranged and made such that a deflection force which is engendered by the first measurement pressure and the second measurement pressure causes deflection of the measurement membrane from its neutral position. The pressure transducer furthermore has a deflection sensor means for measuring deflection of the measurement membrane from its neutral position and for producing a deflection signal depending on this deflection. The pressure transducer according to the invention is characterized in that it furthermore has an electromagnet arrangement which comprises magnet means and a microengineering current-carrying coil, and an electrical switching arrangement. The electromagnet arrangement is made to produce a magnetic force which couples the measurement membrane to the housing and the electrical switching device is used to produce a coil current depending on the deflection signal such that the magnetic force acting on the measurement membrane essentially compensates for the deflection force which is caused by the differential pressure and which acts on the measurement membrane. The coil current for producing the magnetic compensation force represents a measure of the differential pressure. The current intensity of the coil current is output as the output quantity of the pressure transducer.

Microengineering is defined as the means and processes which are employed to use and/or produce (preferably in series) extremely small technical devices or equipment. In microengineering the aspect of production, especially series production, is just as important as that of the function of a microengineering device. Microengineering components (for example, the coil of the pressure transducer as in the invention) therefore often have essentially flat, two-dimensional structures. They can be produced by means of methods of planar technology, especially printing processes (for example screen printing in thick film technology, vapor deposition in thin film technology, UV lithography).

In the context of microengineering, the term "small", at least in mechanical and/or electromechanical devices, means that their main dimensions are in the centimeter or subcentimeter range.

A "magnetic force" is the force which an electrical conductor or permanent magnet experiences in a magnetic field and "magnetic means" are means of electrically conductive and/or magnetic material which can experience a magnetic force in a magnetic field.

The differential pressure transducers known to date are not suited for production with methods of planar technology. They have components with structures which are essentially three-dimensional and their production is structurally complex. In the pressure transducer as claimed in DE-A1-31 06 835 this applies especially to the compensation device which comprises an electromagnet with a coil and a permanent magnetic armature, and the two have structurally complex three-dimensional structures. Conversely, the microengineering (and thus flat) coil of the differential pressure transducer according to the invention can be produced with means and methods of microengineering. In this way the possibility of economical, large-series production of the differential pressure transducer as claimed in the invention is established. At the same time, the microengineering structure of the coil yields an outstanding possibility for miniaturization not only of the coil itself, but the entire differential pressure transducer in accordance with the invention. By miniaturizing the pressure transducer the measurement errors which are caused by gravity can be greatly reduced, since the weight of the membrane decreases with the cube of the geometric dimensions. The reduction of the influence of gravity then allows the use of mechanically softer materials for producing the measurement membrane. In this way the choice of materials which can be used to produce the measurement membrane is greatly increased so that some chemically resistant materials can be used which, to date, had not been considered for the measurement membrane of known pressure transducers, because their low mechanical strength under the influence of gravity and/or large differential pressures has/have caused overly large measurement errors.

In the differential pressure transducer as claimed in the invention, the feedback principle is used to measure the differential pressure. The pressure difference to be measured between the two measurement spaces is applied to the membrane device. By means of the differential pressure either directly (i.e. without pressure transfer) or indirectly (i.e. after amplifying or weakening the pressure) a deflection force is produced which causes deflection of the measurement membrane of the membrane device from its neutral position. A deflection sensor measures the deflection of the measurement membrane from its neutral position, produces a deflection signal which corresponds to this deflection, and supplies it to an electrical switching device. The measurement membrane is coupled by magnetic means and an electromagnetic arrangement which comprises a current-conducting coil to the housing of the pressure transducer, i.e there is a magnetic force which is acting directly or indirectly between the measurement membrane and the housing. The switching device is electrically connected to the coil of the electromagnet arrangement and produces a coil current such that the coil interacts by means of magnetic force with the magnetic means such that overall a force is exerted by the housing on the measurement membrane which essentially compensates for the deflection force acting on the measurement membrane in order to cancel the deflection of the measurement membrane from its neutral position. This is, in turn, measured by the deflection sensor (thus the feedback loop is closed). As a measure for the differential pressure the strength of the coil current which is necessary to produce the magnetic compensation force is measured. This in contrast, for example, to the differential pressure transducers of the type described in WO 96/41141 where the deflection of the measurement membrane is used as a measure for the differential pressure. Thus, in the differential pressure transducer according to the invention, large deflections of the measurement membrane are avoided. This yields the advantage that, in the pressure transducer of the invention, the measurement membrane need not meet high demands with respect to its mechanical properties in terms of to elasticity and/or linearity. In particular, it is feasible to produce the measurement membrane of the invention using those materials which are mechanically soft and/or which have a small linear elasticity range but, for example, are especially resistant to corrosion.

The differential pressure transducer according to the invention overall represents an intelligent measurement sensor in which the pressure is measured by active compensation of the deflection of a mechanical structure, by which the measurement result becomes essentially independent of the mechanical properties of the structure.

Preferably the electromagnet arrangement is made for non-contact exertion of force between the housing and the measurement membrane by means of remote magnetic action. This embodiment of the invention enables prompt control of the opposing force which compensates for the compressive force.

The coil can be attached to the housing by gluing, embedding, welding, soldering or in some other suitable way. Preferably the coil is embedded completely in one housing wall which borders the measurement chamber so that the coil top which faces the measurement membrane is essentially coplanar to the surface of this housing wall facing the measurement membrane. This embodiment of the invention is especially advantageous when the pressure transducer is being cleaned.

Advantageously the measurement membrane is located in the measurement chamber which is defined by the housing such that the housing walls ensure effective overload protection against mechanical overloads of the measurement membrane. This is done by the distance which is perpendicular to the plane of the measurement membrane between the measurement membrane and the housing walls which border the measurement chamber being chosen to be as small ask possible. When the measurement membrane is overloaded as a result of the overly large differential pressure then the measurement membrane contacts one housing wall and is supported by it, thus preventing inelastic extension of the measurement membrane.

According to one preferred embodiment of the invention the electromagnet arrangement is made as an integral part of the deflection sensor means, to measure the deflection of the measurement membrane from its neutral position an electrical signal being measured which has been produced in the coil by relative motion between the magnetic means and the coil. In this embodiment of the invention thus the electromagnet arrangement on the one hand has the function of a servo device (or an actuator) for the measurement membrane by its acting via magnetic force on the measurement membrane in order to return it into its neutral position against the compressive force. On the other hand, the electromagnet arrangement also has the function of a deflection sensor means or a sensor for measuring the deflection of the measurement membrane from its neutral potion. Thus the sensor is at the same time also an actuator. In other embodiments of the invention the functions of the servo device and the deflection sensor means however can also be assumed by separate devices. Thus for example a Hall probe can be used to measure the deflection of the measurement membrane.

Advantageously the electromagnet arrangement is made and arranged essentially symmetrical with respect to a plane of symmetry which is defined by the measurement membrane, in order to reduce the formation of the asymmetrical temperature distributions which cause errors in pressure measurement. These asymmetrical temperature distributions are often the cause of errors in pressure measurement by means of differential pressure transducers. With the symmetrical formation of the electromagnet arrangement at the same time position-dependent errors can be actively compensated, which even in the pressure transducer as claimed in the invention are still present as a result of the action of gravity on the measurement membrane when the latter is not positioned vertically.

According to one preferred embodiment of the invention the membrane device comprises simply a single membrane in the form of the measurement membrane, the membrane device being made and the measurement membrane being arranged such that one side of the measurement membrane is directly exposed to the first measurement pressure and the other side of the measurement membrane is directly exposed to the second measurement pressure. This embodiment of the invention enables simple construction of the membrane device with simply one single membrane.

According to another preferred embodiment of the invention the membrane device comprises a first pressure pick-up membrane which can be exposed to the first measurement pressure and which is coupled to transfer force to the measurement membrane. For purposes of conversion of force per unit area (i.e. amplification or reduction of the surface force) the effective (i.e. freely suspended) surface of the first pressure pick-up membrane has a surface size which differs from the effective surface of the measurement membrane. The measurement of comparatively large differential pressures is enabled by this embodiment of the invention. The pressure pick-up membrane can be connected by means of a solid connecting part to the measurement membrane in order to transfer force. The membrane device can furthermore comprise a second pressure pick-up membrane which can be exposed to the second measurement pressure and which is coupled to the measurement membrane in order to transfer force, and for purposes of conversion of force per unit area the effective surface of the second pressure pick-up membrane can have a surface size which is different from the effective surface of the measurement membrane.

Preferably the measurement membrane consists essentially of a mechanically soft material with high resistance to corrosion. Preferably the membrane material is also resistant to other chemical reactions when it comes into contact with chemically reactive media. Possible materials for producing the measurement membrane are polytetrafluorethylene (PTFE, better known under the commercial name of Teflon), ethylene tetrafluorethylene (EFTE), polyethylene cotrifluorethylene (ECTFE), perfluoraloxypolymers (PFA), polyvinylidene fluoride (PVDF), copolymers of tetrafluormethylene/hexafluorpropylene (FEP), other fluorine-containing plastics, polyethylene (PE), stainless steel, polyesters, etc.

The measurement membrane however can also be produced from a conventional membrane material and/or by means of suitable treatment of the surface it can be protected against corrosion and/or other chemical reactions.

In one preferred embodiment of the invention the magnetic means comprise means which are formed essentially from ferromagnetically soft material. With a given coil geometry, coil current, and distance between the coil and the magnetic means thus extremely large magnetic forces can be produced between the housing and the measurement membrane. To produce the magnetic means according to this embodiment of the invention suitable ferromagnetically soft materials are amorphous metals, iron-nickel alloys (for example, as are sold under the commercial name Permalloy), silicon iron, iron, ferrites, silicon-iron-aluminum and others.

Furthermore, it is preferred that the magnetic means comprise permanent magnetic means of ferromagnetically hard material. The group of materials suitable for producing magnetic means according to this embodiment of the invention comprises aluminum-nickel, aluminum-nickel-cobalt, rare earths, neodymium-iron-boron, neodymium-iron-cobalt, hard ferrite magnets and others.

In still another version of the invention the magnetic means comprise means which are produced from electrically conductive material, preferably gold or copper. The magnetic means in this version of the invention generally do not consist of magnetic material, but rather the electrically conductive material acts only in conjunction with an alternating current as an (electro)magnet. The magnetic means can be made for example in the form of a short-circuited flat coil or in the form of a plate of electrically conductive material. In this embodiment of the invention in the coil of the electromagnet arrangement an alternating current is generated which produces a magnetic field which changes over time in the area of the magnetic means. In this way a current is induced in the (electrically conductive) magnetic means so that they act as an electromagnet and experience a force as a result of the magnetic field.

In one preferred embodiment of the invention the switching device for controlling the coil currents in two coils comprises a differential oscillator. In alternative embodiments of the invention the switching device for controlling the current or currents in one or more coils can comprise one or more bridge circuits.

The following detailed description of this invention is used in conjunction with the attached drawings only as an example for better understanding of the invention and should not be interpreted as a limitation of the scope of protection of the patent claims. For one skilled in the art other advantageous embodiments and combinations of features can be easily recognized from the following description in conjunction with the attached drawings and the totality of the patent claims and however still lie within the scope of this invention.

BRIEF DESCRIPTION OF THE DRAWINGS

The drawings represent preferred embodiments of this invention.

FIG. 7b shows a simplified sectional view along line 1—1 through the pressure transducer from FIG. 7a;

FIG. 8b shows a simplified sectional view along line 2—2 through the pressure transducer from FIG. 8a;

FIG. 9b shows a simplified sectional view along line 3—3 through the pressure transducer from FIG. 9a;

FIG. 10b shows a simplified sectional view along line 4—4 through the pressure transducer from FIG. 10a;

FIG. 11b shows a simplified sectional view along line 5—5 through the pressure transducer from FIG. 11a;

FIG. 12b shows a simplified sectional view along line 6—6 through the pressure transducer from FIG. 12a;

FIG. 13b shows a simplified sectional view along line 7—7 through the pressure transducer from FIG. 13a;

FIG. 14b shows a simplified sectional view along line 8—8 through the pressure transducer from FIG. 14a;

FIG. 15b shows a simplified sectional view along line 9—9 through the pressure transducer from FIG. 15a;

FIG. 16b shows a simplified sectional view along line 10—10 through the pressure transducer from FIG. 16a;

FIG. 17b shows a simplified sectional view along line 11—11 through the pressure transducer from FIG. 17a;

Corresponding parts are provided with the same reference numbers in the figures.

EMBODIMENTS OF THE INVENTION

Figure 1:
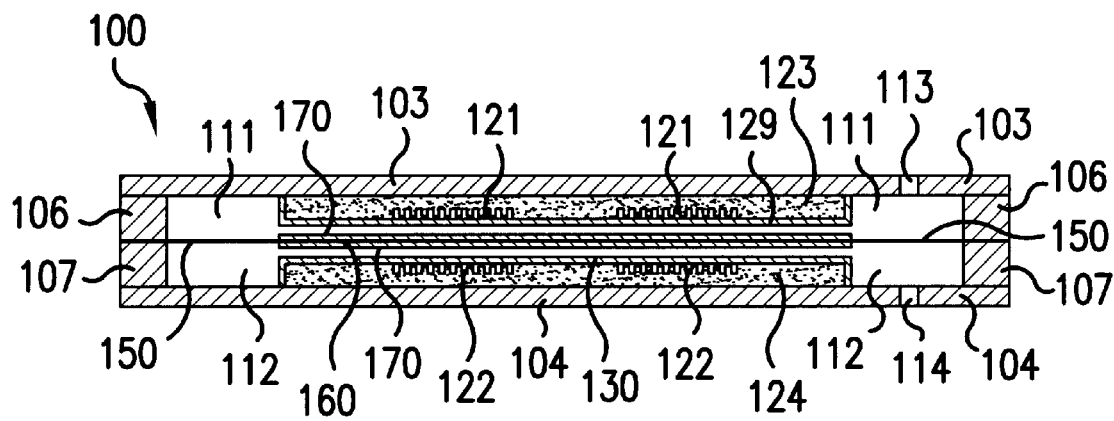
FIG. 1 shows a first embodiment of a differential pressure transducer according to the invention in a simplified sectional view from the side.

FIG. 1 shows a differential pressure transducer 100 according to a first embodiment of the invention in a sectional view from the side.

A measurement membrane 150 is clamped between two annular spacers 106, 107. In the embodiments of the invention shown in FIGS. 1 to 4 the measurement membrane 150 along its periphery is glued to the annular spacers 106, 107 and is thus clamped to be suspended essentially in the middle between the two annular spacers 106, 107. Basically however also other types of attachment for attaching the membrane 150 between the spacers 106, 107 can be used.

The annular spacers 106, 107 are each connected to a circular cover plate 103, 104 such that the spacers 106, 107 and the cover plates 103, 104 form an essentially (except for openings 113, 114) closed cylindrical housing with a circular cross section, the cylinder wall being formed from the annular spacers 106, 107, the cylinder cover from one circular cover plate 103 and the cylinder bottom from the other circular cover plate 104. The housing defines an essentially (except for openings 113, 114) closed measurement chamber which is divided by the measurement membrane 150 into a first measurement space 111 and a second measurement space 112.

In the embodiment of the invention shown in FIG. 1 the spacers 106, 107 and the cover plates 103, 104 which form the housing consist of stainless steel and the measurement membrane 150 of polytetrafluorethylene (PTFE, better known under the commercial name Teflon). In the other embodiments of the invention the housing can also be produced from other suitable materials, for example from silicon. A housing produced from silicon has the advantage that the housing structures can be produced by etching.

The first measurement space 111 is provided with a first opening 113 in order to create a passage for a fluid which is under a first measurement pressure from outside the housing to the first measurement space 111 so that the latter is exposed to the first measurement pressure. The second measurement space 112 is provided with a second opening 114 in order to create a passage for a fluid which is under a second measurement pressure from outside the housing to the second measurement space 112 so that the latter is exposed to the second measurement pressure. The measurement membrane 150 is arranged such that it experiences a deflection from its neutral position shown in FIG. 1 by the compressive force of the differential pressure resulting from the first measurement pressure and the second measurement pressure.

On the inside of the housing cover 103 there is a coil insulating frame 123 in the form of an essentially circular disk. The disk 123 is provided on its surface facing the measurement membrane 150 with an annular recess in which a flat microengineering coil 121 is located. In the embodiment of the invention shown in FIG. 1 the turns of the coil 121 are made of gold.

The disk-shaped coil insulating frame 123 consists preferably of a ferromagnetic material in the form of an amorphous metal which can be selected for example from the group of soft magnetic amorphous alloys as are sold by the German company "Vacuumschmelze GmbH" under the commercial name Vitrovac. In the embodiment of the invention shown in FIG. 1 the alloy named Vitrovac 6125 was used. The core of the coil 121 is formed by the center of the coil insulating frame 123.

Between the coil 121 and the coil insulating frame 123 there is a layer of an electrically insulating material, for example silicon dioxide.

In the embodiment of the invention shown in FIG. 1, the coil arrangement 121, 123 on its entire surface which is exposed to the medium in the measurement space is provided with a protective layer 129 in order to protect the coil arrangement 121, 123 against chemically corrosive media. The protective layer 129 consists in this embodiment of a perfluorinated compound as is conventionally used in chemical equipment building for corrosion-proof lining and coating of containers, pipelines, pumps and so forth.

However other suitable (nonferromagnetic) materials can also be used to produce the protective layer 129 or in the case of chemically noncorrosive media, no protective layer at all is necessary.

Furthermore, in the embodiment of the invention shown in FIG. 1, on the inside of the housing bottom 104 there is a second coil arrangement 122, 124 which is analogous to the first coil arrangement 121, 123. The second coil arrangement 122, 124 which comprises the coil insulating frame 124 with an annular recess, a coil 122, an insulating layer and a protective layer 130 is located essentially symmetrically to the first coil arrangement 121, 123 with reference to the plane of symmetry which is defined by the measurement membrane 150 in the neutral position in order to reduce formation of asymmetrical temperature distributions which cause errors in pressure measurement.

In the embodiment of the invention shown in FIG. 1 the measurement membrane 150 is provided with a layer of ferromagnetic material 160 which forms the magnetic means. The layer 160 is arranged essentially symmetrically with respect to the plane of symmetry defined by the measurement membrane 150. In this way the formation of temperature distributions which are asymmetrical with respect to this plane of symmetry is reduced. The magnetic means formed by the ferromagnetic layer 160 on their entire surface which is exposed to the media in the measurement spaces 111, 112 are provided with a protective layer 170 in order to protect the magnetic means 160 against chemically corrosive media. In this embodiment the magnetic means protective layer 170 consists in turn of a perfluorinated compound, as is used conventionally in chemical equipment building for corrosion-proof lining and coating of containers, pipelines, pumps, etc.

However, other suitable (nonferromagnetic) materials can be used to produce the protective layer 170 or in the case of chemically noncorrosive media no protective layer at all is necessary.

The electromagnetic arrangement which has been formed from the coil arrangements 121, 123, 122, 124 and the magnetic means 160 is used as a deflection sensor means on the one hand to measure a deflection of the measurement membrane 150 from its neutral position and to produce a deflection signal depending on this deflection. A change of the differential pressure which results from the first measurement pressure and the second measurement pressure causes a deflection of the measurement membrane 150 essentially perpendicularly to the plane of the measurement membrane 150. In doing so the magnetic means 160 formed from the ferromagnetic layer are moved relative to the coils 121, 122 and depending on the deflection of the magnetic means 160 with respect to the coils 121, 122, produce one induction current at a time in the two coils 121, 122. These induction currents in the coils 121, 122 are used as the deflection signal of the deflection sensor means which is transmitted to an electrical switching device for control of the pressure transducer.

On the other hand, the arrangement formed from the coil arrangements 121, 123, 122, 124 and the magnetic means 160 is used as a servo device (or actuator) for the measurement membrane 150 by its acting via a magnetic force on the measurement membrane 150 in order to return it to its neutral position against the compressive force. The switching device is electrically connected to the coils 121, 122. Based on the measured deflection signal the switching device produces one current each in the coils 121, 122. The coil currents are such that the coils 121, 122 interact by means of magnetic force with the magnetic means 160 on the measurement membrane 150 such that the total magnetic force essentially compensates for the compressive force acting on the measurement membrane 150 in order to cancel the deflection of the measurement membrane 150 from its neutral position. The coil currents for producing the magnetic compensation force represent a measure for the differential pressure and are output as the output quantity of the pressure transducer 100.

In the embodiments of the invention shown in FIGS. 1 to 4 the flat coils 121, 122 have a diameter of roughly 11 mm. The turns are made of gold and the wire of the turns has a diameter of roughly 50 microns. The thickness of the pressure transducers 100, 200, 300, 400 shown in FIGS. 1 to 4 is roughly 1 mm. It goes without saying that even pressure transducers dimensioned differently can be produced without departing from the protective scope of the invention as is defined in the independent claim.

Figure 2:
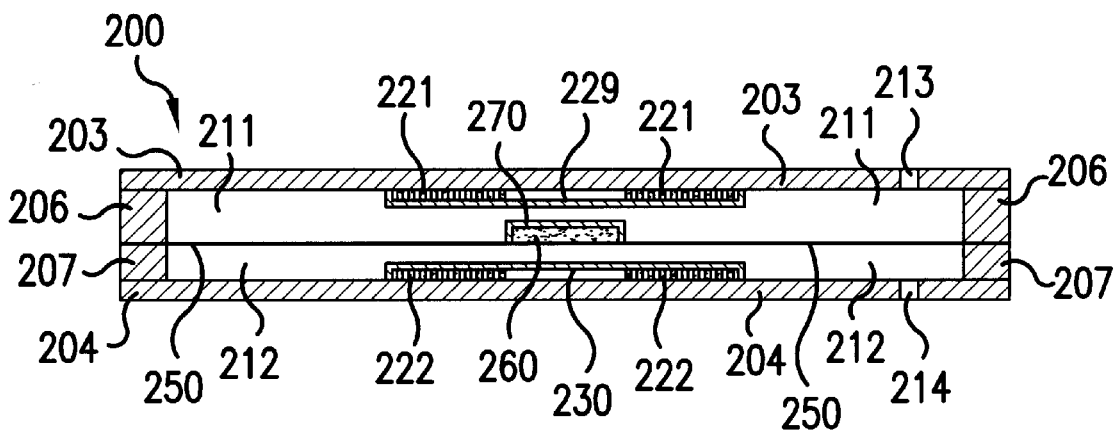
FIG. 2 shows another embodiment of a differential pressure transducer according to the invention in a simplified sectional view from the side.

FIG. 2 shows a differential pressure transducer 200 according to another embodiment of the invention in a sectional view from the side. The housing which comprises the spacers 206, 207, the cover plates 203, 204 and the openings 213, 214 with the measurement chamber which is divided by the measurement membrane 250 into two measurement spaces 211 212 corresponds in form and function essentially to the housing which is shown in FIG. 1.

In the embodiment of the invention shown in FIG. 2 the flat coils 221, 222 of gold are located directly on the insides of the housing covers 203, 204. This represents a first difference from the embodiment of the invention shown in FIG. 1. The coils 221, 222 on their entire surfaces which are exposed to the medium in the measurement spaces 211 212 are in turn provided with a protective layer 229, 230 in order to protect them against chemically corrosive media.

The embodiment of FIG. 2 differs essentially from the embodiment of FIG. 1 with respect to the magnetic means 260 which are located on the measurement membrane 250. In the embodiment of the invention shown in FIG. 2 the magnetic means 260 are formed by a permanent magnet 260 of magnetically hard material which is located on the measurement membrane 250. An electromagnetic interaction for measuring the deflection and for producing a magnetic compensation force thus occurs between the permanent magnet 260 and the coils 221, 222. The electromagnetic arrangement which is formed from the coil arrangements 221, 222 and the magnetic means 260 is used in turn on the one hand as a deflection sensor means for measuring the deflection of the measurement membrane 250 from its neutral position and for producing a deflection signal depending on this deflection, and on the other hand as the servo device or actuator for the measurement membrane 250.

The surfaces of the permanent magnet which are exposed to the media in the measurement spaces are in turn provided with a magnetic means protective layer in order to protect the permanent magnet against chemically corrosive media.

Figure 3:
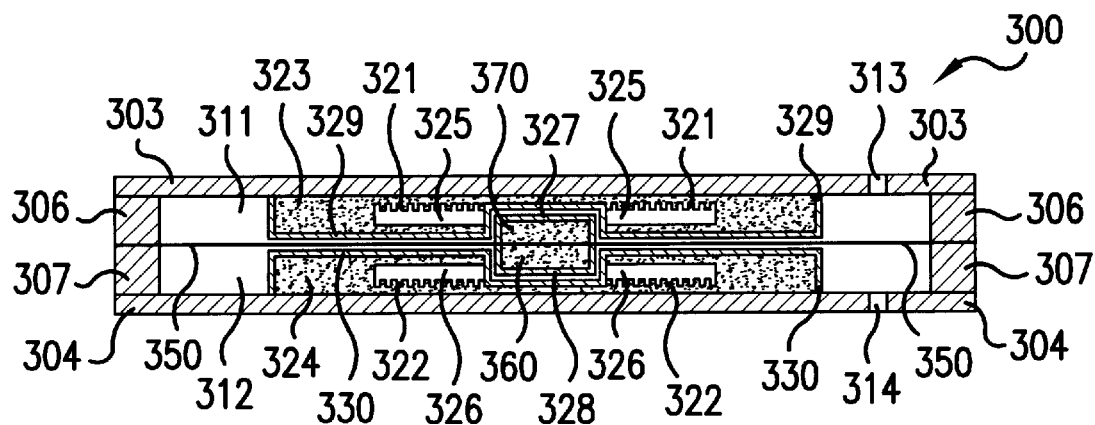
FIG. 3 shows another embodiment of a differential pressure transducer according to the invention in a simplified sectional view from the side.

While in the embodiment of the invention shown in FIG. 2 the magnetic means 260 of permanent magnetic material are not located symmetrically with respect to the measurement membrane 250, in the embodiment of the invention shown in FIG. 3 the permanent magnet 360 which forms the magnetic means 360 is located essentially symmetrically with respect to the plane of symmetry defined by the measurement membrane 350. Furthermore, in contrast to the arrangement as shown in FIG. 2, in the embodiment of the invention shown in FIG. 3 the flat coils 321, 322 are each located in a tunnel-like recess 325, 326 of the coil insulating frames 323, 324 which for their part are attached to the insides of the housing cover 303 or the housing bottom 304. The essentially circular disk-shaped coil insulating frames 323, 324 in their center each have one depression 327, 328 for partially holding the permanent magnet 360. Compared to the arrangement shown in FIG. 2, larger magnetic forces can be achieved between the coils 321, 322 and the permanent magnet 360 by this arrangement.

Otherwise, the embodiments of the invention which are shown in FIGS. 2 and 3 are essentially the same: The electromagnetic interaction for measuring the deflection and for producing a magnetic compensation force in both cases is caused by the interaction of a permanent magnet 260; 360 which is located on the measurement membrane 250, 350 with the coils 221, 222; 321, 322 which are located on the housing.

Figure 4:
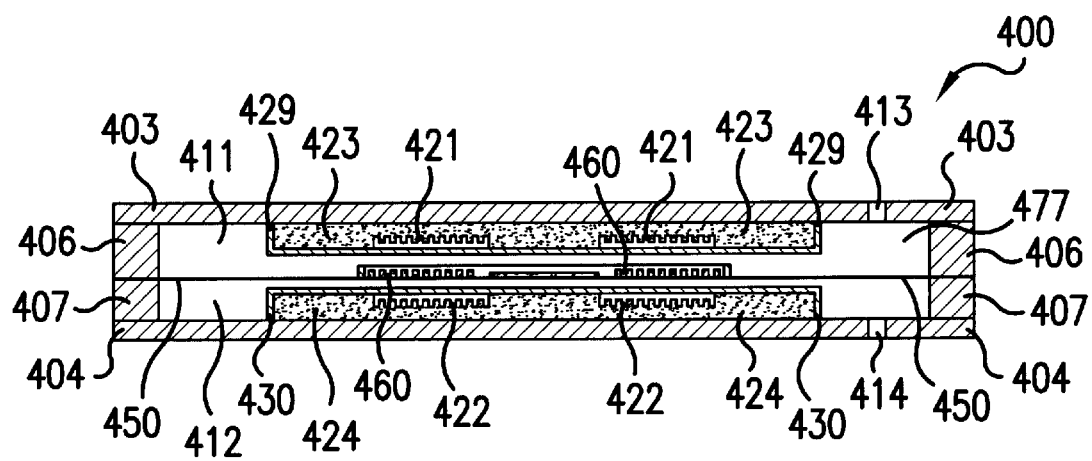
FIG. 4 shows another embodiment of a differential pressure transducer according to the invention in a simplified sectional view from the side.

In the embodiment of the invention which is shown in FIG. 4, the housing 403, 404, 406, 407 and the coil arrangements 421, 423, 422, 424 are made identically to the embodiment of the invention which is shown in FIG. 1. The magnetic means in the embodiment which is shown in FIG. 4 are however formed by a flat, short-circuited coil 460 which is located on the measurement membrane 450. The electrically conductive coil 460 is in turn made of gold. While in the embodiment of the invention which is shown in FIG. 4 the coil 460 is not symmetrical with respect to the measurement membrane 450, but is located on one side of the measurement membrane 450, in one alternative embodiment of the invention on the other side of the measurement membrane there can be another coil in order to form symmetrical magnetic means with respect to the measurement membrane 450.

In the embodiment of the invention which is shown in FIG. 4, in the coils 421, 422 which are located on the housing an alternating current is produced which in the area of the measurement membrane 450 produces a magnetic field which varies in time. In this way, in the (electrically conductive) magnetic means 460 currents are induced (eddy currents) so that the magnetic means 460 act as an electromagnet and based on the magnetic field experience a force which is transferred to the measurement membrane 450 by the connection of the magnetic means 460 to the measurement membrane 450. In another version of this embodiment of the invention the short-circuited flat coil 460 in the measurement membrane 450 is replaced by a plate of electrically conductive material.

In the embodiment of the invention which is shown in FIG. 4 the electromagnetic interaction for measuring the deflection and for producing a magnetic compensation force is based on the interaction between the coils 421, 422 which are located on the housing and which carry an alternating current, and the magnetic means 460 of electrically conductive material which are located on the measurement membrane 450 and which act as the electromagnet in the magnetic field produced by the alternating current in the coils 421, 422.

Figure 5:
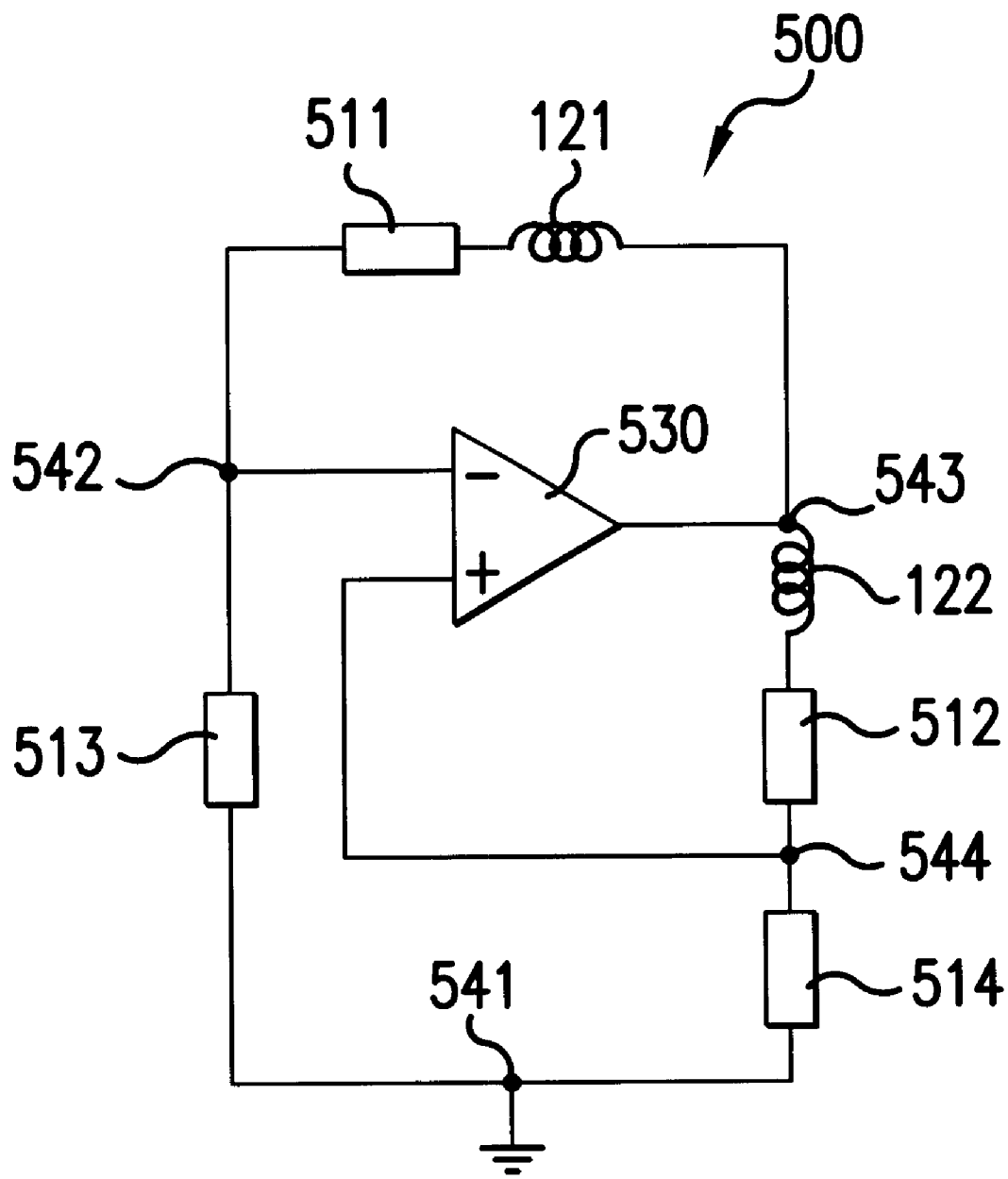
FIG. 5 shows a schematic circuit diagram of a switching device for control of the currents in the coils of the pressure transducer shown in FIG. 1.

In the embodiments of the invention which are shown in FIGS. 1 to 4 the switching device for controlling the coil currents comprises a differential oscillator. FIG. 5 shows the block diagram of the oscillator 500 which is used to control the coil currents in the coils 121 and 122 of the differential pressure transducer 100 which is shown in FIG. 1.

The inverting input 542 of an operational amplifier 530 is connected in series via a resistor 511 to one terminal of the coil 121 of the pressure transducer 100. The other terminal of the coil 121 is connected to the output 543 of the operational amplifier 530. Furthermore, the inverting input 542 is connected to the ground 541 via the resistor 513. The noninverting input 544 of the operational amplifier 530 is connected on the one hand in series via the resistor 512 to one terminal of the coil 122 of the pressure transducer 100. The other connection of the coil 122 is connected to the output 543 of the operational amplifier 530. On the other hand, the noninverting input 544 of the operational amplifier 530 is also connected via the resistor 514 to the ground 541. The frequency of the electrical signal at point 543 represents a measure for the differential pressure which has been measured by the differential pressure transducer 100 and is output as the output quantity of the pressure transducer 100.

Figure 6:
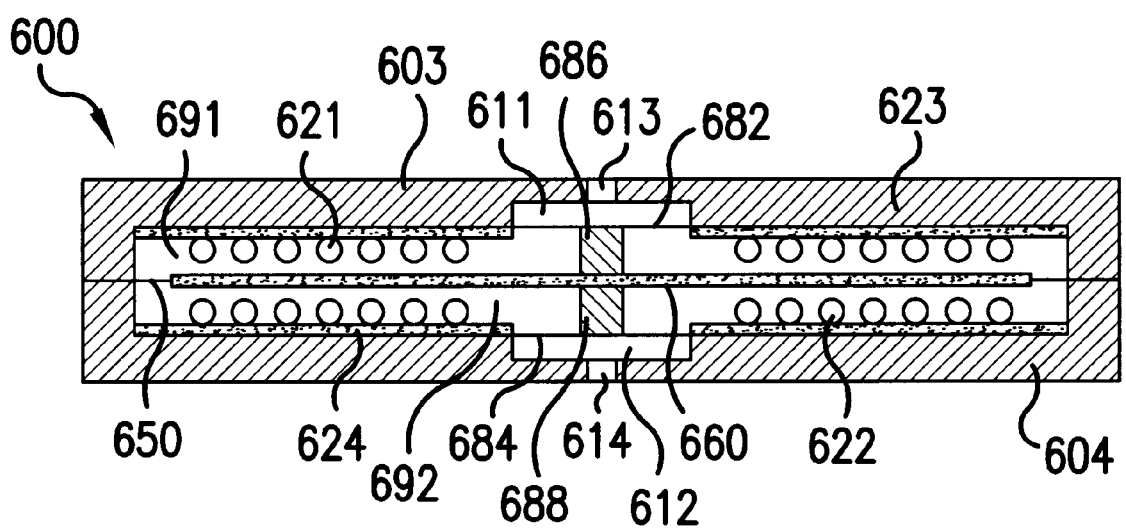
FIG. 6 shows another embodiment of a differential pressure transducer according to the invention in a simplified sectional view from the side.

FIG. 6 shows a differential pressure transducer 600 according to another embodiment of the invention in a simplified sectional view from the side. The pressure transducer 600 which is shown in FIG. 6 differs from the pressure transducer 100 which is shown in FIG. 1 essentially by an membrane device which has been configured differently.

The circular cylindrical housing of the pressure transducer 600 which shown in FIG. 6 is made of silicon and comprises a housing cover 603, a housing bottom 604 and an annular housing wall. The housing which is closed to the medium to be measured except for access openings 613, 614 defines the measurement chamber of the pressure transducer 600. Roughly at half the height between the housing bottom 604 and the housing cover 603 as part of a membrane device the measurement membrane 650 along its edge is attached to the housing wall and otherwise hangs freely in the measurement chamber.

Analogously to the pressure transducer shown in FIG. 1, the measurement membrane of the pressure transducer shown in FIG. 6 is provided with a layer 660 of ferromagnetic material in order to be used as the magnetic means for an electromagnet arrangement. The electromagnet arrangement furthermore comprises a first microengineering coil 621 which is located on a flat annular coil insulating frame 623 of ferromagnetic material on the inside of the housing cover 603 and a second microengineering coil 622 which is located on a flat annular coil insulating frame 624 of ferromagnetic material on the inside of the housing bottom. Between the coils 621, 622 and their assigned coil insulating frames 623 and 624 there is one electrically insulating layer of silicon oxide each.

The electromagnet arrangement of the pressure transducer which is shown in FIG. 6, the arrangement formed from the two coils 621 and 622 and the magnetic means 660, corresponds with reference to function and structure essentially to the electromagnet arrangement of the pressure transducer 100 which is shown in FIG. 1, except for the fact that in the pressure transducer 600 shown in FIG. 6 there is no magnetic means protective layer and there are no protective layers for the coils.

In the area of the center of the circular housing cover 603 on its inside a circular cylindrical recess is formed which is separated against the housing interior by a first pressure pick-up membrane 682. The first pressure pick-up membrane 682, like the measurement membrane 650, is made of PTFE (Teflon). The recess which is bordered by the housing cover 603 and the first pressure pick-up membrane 682 defines the first measurement space 611 of the pressure transducer 600. In the pressure transducer shown in FIG. 6 the diameter of the circular cylindrical first measurement space 611 measures roughly 1/5 of the diameter of the entire circular cylindrical measurement chamber. Accordingly the freely suspended surface of the first pressure pick-up membrane 682 measures roughly 1/25 of the freely suspended surface of the measurement membrane 650.

The first pressure pick-up membrane 682 is connected by means of a first solid and inflexible connecting part 686 in a force-transferring function to the measurement membrane 650, by the first connection part 686 both tension and also compressive forces being transmitted between the two membranes 650, 682. The first connecting part is made of a photoresistor plastic and can thus be produced by etching.

A first opening 613 leads through the housing cover 603 from the outside of the housing into the first measurement space 611 in order to create a passage for a fluid under the first measurement pressure from outside the housing to the first measurement space 611 so that the first measurement space 611 is exposed to the first measurement pressure. The first pressure pick-up membrane 682 separates the first measurement space 611 hermetically from the intermediate space 691 which is formed between the first pressure pick-up membrane 682 and the measurement membrane 650. For this reason, for the components of the electromagnetic arrangement (coil 621 and magnetic means 660) which are located in this intermediate space 691 no protection against the fluid to be measured is necessary since the fluid does not reach the intermediate space 691.

Analogously, in the area of the center of the circular housing bottom 604 on its inside a circular cylindrical recess is formed which is separated against the housing interior by the second pressure pick-up membrane 684. The recess bordered by the housing bottom 604 and the second pressure pick-up membrane 684 defines the second measurement space 612 of the pressure transducer 600. A second opening 614 leads through the housing bottom 604 in order to create a passage for a fluid under the second measurement pressure so that the second measurement space 612 is exposed to the second measurement pressure. The second pressure pick-up membrane 684 is connected by means of a second solid connecting part 688 in a force-transferring function to the measurement membrane 650. In the pressure transducer 600 shown in FIG. 6 the two openings 613, 614 are the two pressure pick-up membranes 682, 684 and the two measurement spaces 611, 612 with reference to the measurement membrane 650 are made and arranged symmetrically to one another.

The membrane device which is formed from the two pressure pick-up membranes 682, 684, the measurement membrane 650 and the connecting sites 686, 688 is used to transfer the surface force.

In a pressure transducer according to the invention the magnetic force which can be produced using the electromagnet arrangement and which acts as a surface force on the measurement membrane is relatively small, among others also as a result of the microengineering structure of the coils. In the pressure transducers of the invention which are shown in FIGS. 1 to 4 the surface force which acts directly on the measurement membrane and which has been produced by the differential pressure to be measured must be completely balanced by the surface force of the electromagnet arrangement. For larger differential pressures this is no longer possible due to the limited electromagnetic surface force. In the pressure transducer which is shown in FIG. 6 the compressive force of the differential pressure acts on the surfaces of the two pressure pick-up membranes 682, 684, while the magnetic force acts essentially on the entire surface of the measurement membrane 650. Because the surface of the measurement membrane 650 is roughly 25 times greater than that of the surfaces of the pressure pick-up membranes 682, 684 and because the measurement membrane 650 is connected in a force-transferring function to the two pressure pick-up membranes 682, 684, for a given limitation of the surface force which can be electromagnetically produced roughly 25 times the pressure differences can be measured with a pressure transducer as shown in FIG. 6 than with the pressure transducer as shown in FIG. 1.

In one preferred (not shown in the figures) version of the invention which differs only slightly from the embodiment of the invention shown in FIG. 6, except for the first pressure pick-up membrane the entire inside of the housing cover is provided with a ferromagnetic layers which is used as the annular coil insulating frame. Likewise, except for the second pressure pick-up membrane the entire inside of the housing bottom is provided with a ferromagnetic layer which is used as the annular coil insulating frame. At the same time the inside of the annular housing wall is also provided with a ferromagnetic layer, the ferromagnetic layers on the housing cover, on the housing wall and on the housing bottom being connected to one another so that except for the sites covered by the two pressure pick-up membranes the entire inside of the pressure transducer housing is provided with a continuous, essentially closed ferromagnetic layer. Furthermore, the entire free surface of the measurement membrane is provided with a ferromagnetic layer which is connected on the edges of the measurement membrane in turn to the ferromagnetic layer on the annular housing wall. Connection of the different ferromagnetic layers to one another enables largely closed magnetic fluxes in these layers. In this way, compared to the embodiment of the invention shown in FIG. 6 with an otherwise identical electromagnet arrangement, larger magnetic forces can be achieved.

FIGS. 7 to 17 schematically show different embodiments of the electromagnet arrangements which are suited for pressure transducers according to the invention. Although in FIGS. 7 to 17 one membrane device and one pressure transducer housing each according to the embodiment of the invention shown in FIG. 6 are indicated, the electromagnet arrangements shown in FIGS. 7 to 17 are equally well suited for use in conjunction with membrane devices and pressure transducer housings according to the embodiments of the invention shown in FIGS. 1 to 4. In FIGS. 7 to 17 in permanent magnets the magnetic pole north is labeled N and south is labeled S. At the same time, in the overhead views of the drawings there is simply one schematic overhead view of a microengineering coil arrangement each.

All the electromagnet arrangements shown in FIGS. 7 to 17 are made symmetrically with reference to the plane of symmetry defined by the measurement membrane.

Figure 7A:
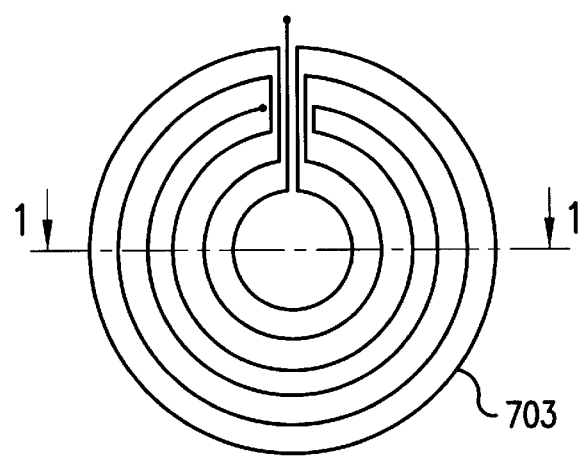
FIG. 7a shows a simplified partial plan view of another embodiment of a differential pressure transducer according to the invention.
Figure 7B:
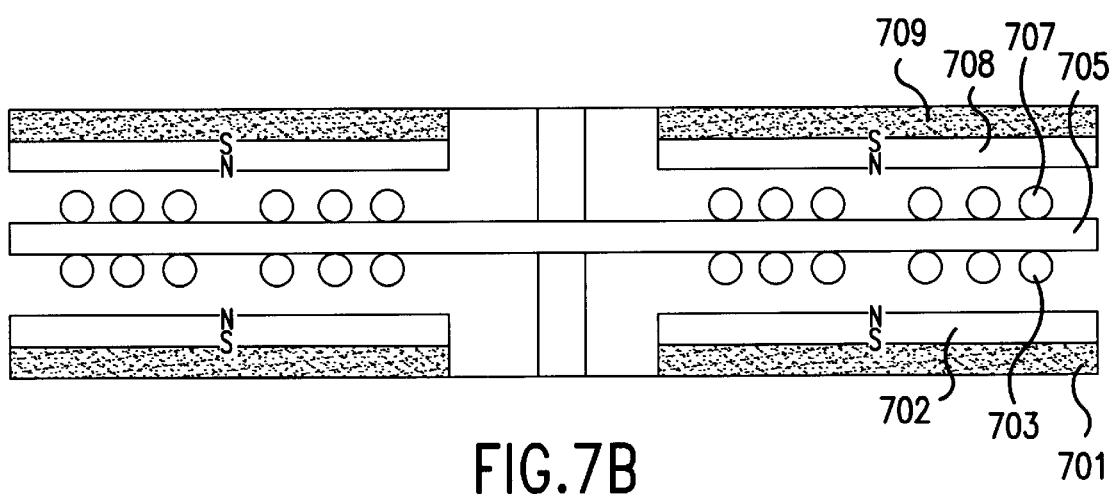

The electromagnet arrangement which is shown in FIG. 7a and 7b comprises an annular ferromagnetic layer 701 which is located on the housing bottom and on which a corresponding annular permanent magnetic layer 702 is applied with a north pole N pointing towards the measurement membrane and with a south pole S pointing toward the housing bottom. The radial component of the magnetic field formed by the ring magnet 702 is opposed in a radially external area on the measurement membrane 705 to the corresponding radial component in a radially inner area. On the surface of the measurement membrane 705 pointing toward the housing bottom a microengineering coil 703 is attached to be essentially blanketing to the ring magnet 702. The coil 703 which is shown in FIG. 7*a* in plan view is made more or less annular. The current flows first through the radially innermost turn in the first direction of rotation, then through the radially outermost turn in the opposite direction of rotation, then through the radially second innermost turn again in the first direction of rotation, then through the radially second outermost turn again in the opposite direction of rotation, etc. Overall the current flows in the coil 703 in the radially outer turns in the first direction of rotation and in the radially inner turns i n the opposite direction of rotation.

Figure 8A:
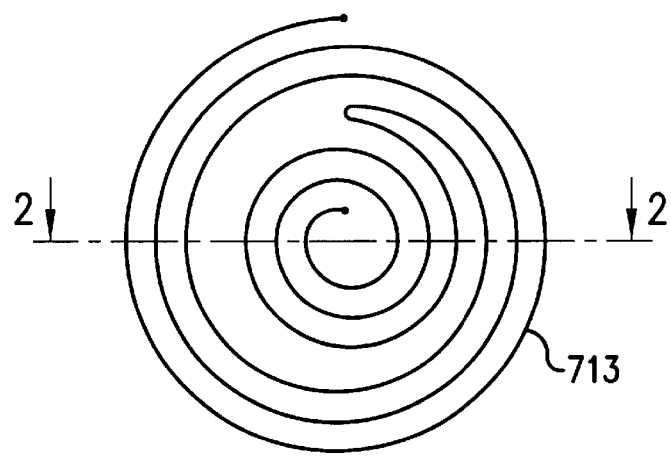
FIG. 8a shows a simplified plan view of another embodiment of a differential pressure transducer according to the invention.
Figure 8B:
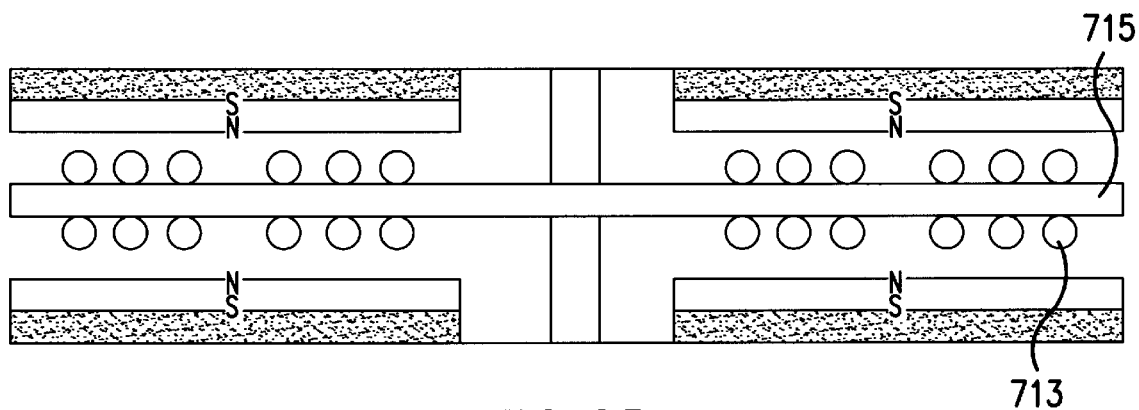

The electromagnet arrangement shown in FIGS. 8*a* and 8*b* corresponds to the electromagnet arrangement shown FIGS. 7*a* and 7*b* except for the coil 713 which is recognizable in the overhead view in FIG. 8. In contrast to the coil 703 in FIG. 7, the current flows in the coil 713 in FIG. 8 through the turns radially from the outside to the inside first in a first direction of rotation, then in the opposite direction of rotation, the current conductors of the coil 713 making a 180 degree turn in the middle coil turn.

Figure 9A:
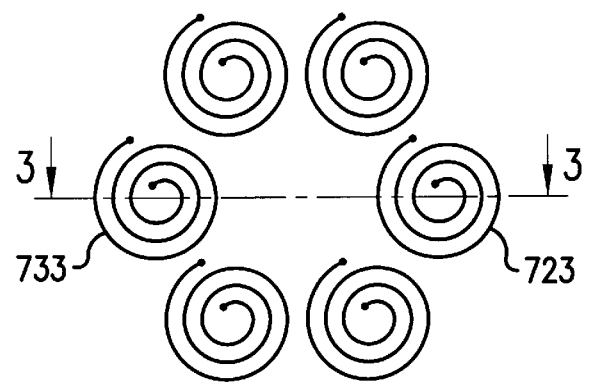
FIG. 9a shows a simplified partial plan view of another embodiment of a differential pressure transducer according to the invention.
Figure 9B:
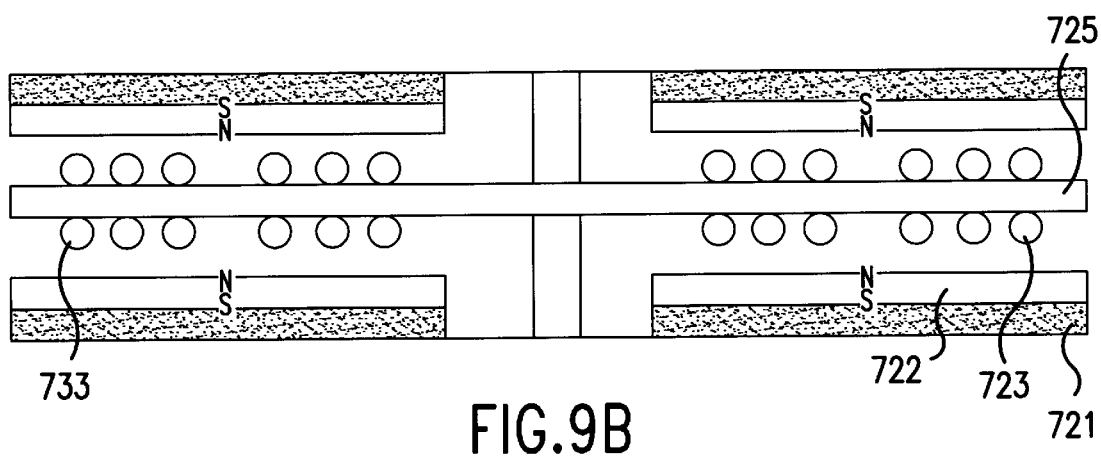

The electromagnet arrangement shown in FIGS. 9*a* and 9*b* corresponds in turn to the electromagnet arrangement shown in FIGS. 7*a* and 7*b* except for the coil 723, 733 which is shown in FIGS. 9*a*. Instead of a single large coil, in the embodiment as shown in FIG. 9 there are six small coils 723, 733 over the ring magnets 722 which are connected to one another in series to be electrically conductive. Problems with reference to saturation in the annular ferromagnetic layer 721 can be avoided by this arrangement.

The carrier layers 701, 711, 721 of the embodiments of the invention shown in FIGS. 7 to 9 can be produced from a nonferromagnetic material (for example silicon) in otherwise identical alternative embodiments. Carrier layers of ferromagnetic materials on the one hand do enable larger magnetic forces to be achieved. On the other hand, they can cause problems in the calibration and adjustment of the pressure transducers as a result of hysteresis in magnetization and as a result of small asymmetries with regard to the measurement membrane.

Figure 10A:
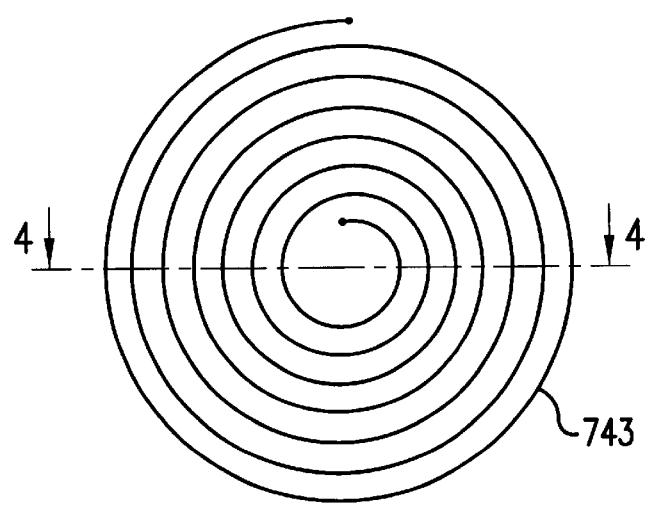
FIG. 10a shows a simplified partial plan view of another embodiment of a differential pressure transducer according to the invention.
Figure 10B:
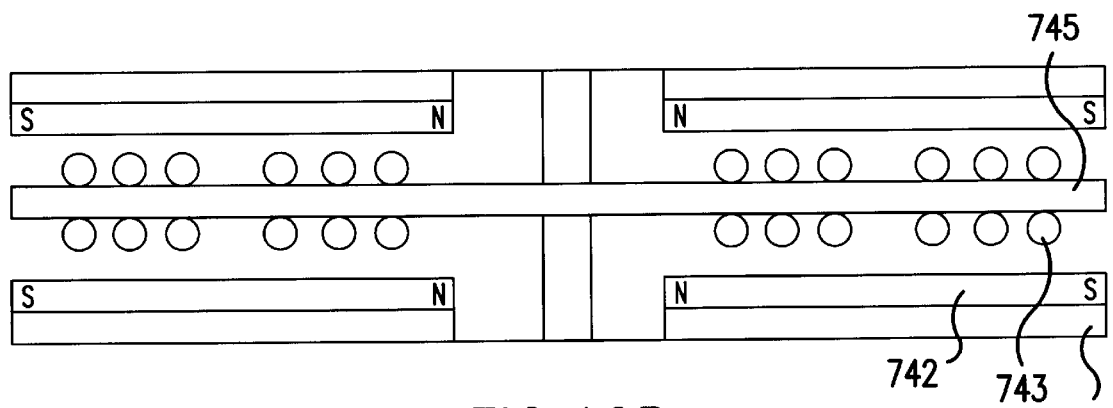

The electromagnet arrangement shown in FIGS. 10*a* and 10*b* differs from the electromagnet arrangement shown in FIGS. 7*a* and 7*b* in that the north pole N of the annular permanent magnetic layer 742 is pointed radially to the inside in a plane parallel to the measurement membrane 745 and the south pole S is pointed radially to the outside. In contrast to the embodiments shown in FIGS. 7 to 9 the permanent magnetic layer 742 in the embodiment shown in FIG. 10 is located on an annular carrier 741 which is formed from a nonferromagnetic material, specifically silicon (the same material comprising the housing of the pressure transducer) in order to prevent short circuits. For interaction with the magnetic field produced by this ring magnet 742, on the surface of the measurement membrane 745 which points towards the bottom of the housing a microengineering coil 743 is attached essentially blanketing to the ring magnet, its current always flow in the same direction of rotation, helically through all the turns.

Figure 11A:
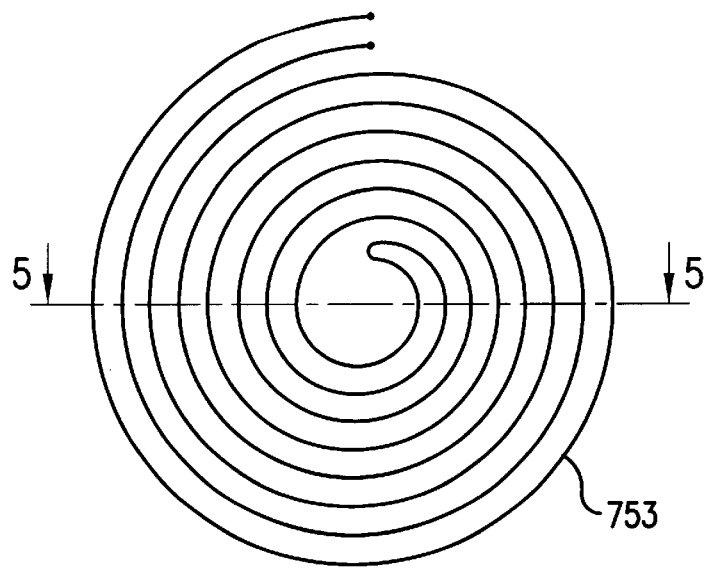
FIG. 11a shows a simplified partial plan view of another embodiment of a differential pressure transducer according to the invention.
Figure 11B:
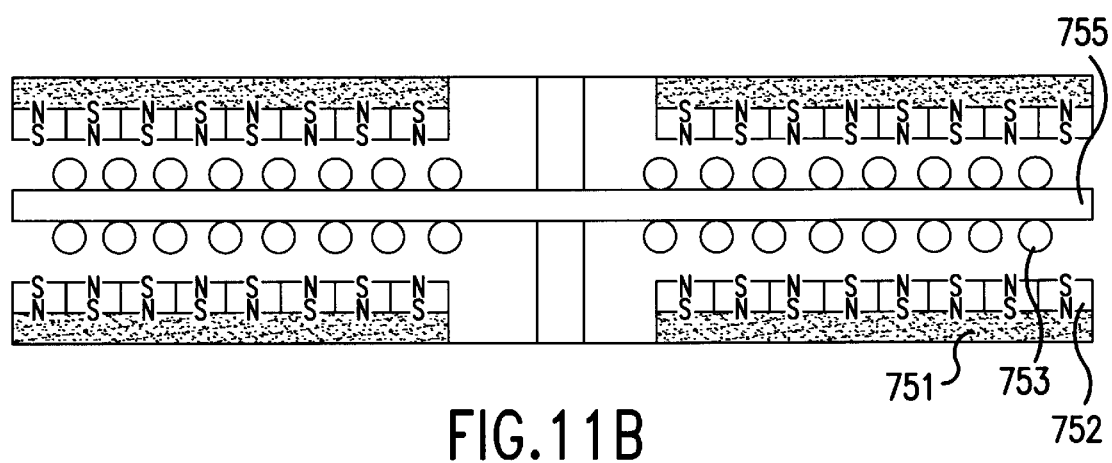

The electromagnet arrangement shown in FIGS. 11*a* and 11*b* comprises an annular ferromagnetic layer 751 which is located on the bottom of the housing. To this layer is applied a permanent magnetic layer 752 which has the form of a double strip and which is located helically on the ferromagnetic layer 751. In one strip of the double strip the north pole N is pointed towards the measurement membrane 755 and the south pole S is pointed towards the housing bottom, in the other strip of the double strip the north pole N is pointed towards the housing bottom and the south pole S is pointed towards the measurement membrane 755. A microengineering coil 753 is attached essentially blanketing to the magnetic layer 752 on the surface of the measurement membrane 755 which points towards the housing bottom. The coil 753 which is shown in FIG. 7*a* in an overhead view is made as a helically arranged double turn. The two turn parts of the double turn are deeply connected to one another in the center of the helix to conduct current so that the current flows from the outside to the inside in succeeding turns in the opposite direction of rotation. The coil 753 is located above the magnetic layer 752 such that the turns of the coil 753 run over the boundaries of the magnetic strips, as can be recognized in FIG. 11*b*.

The measurement membranes 705, 715, 725, 745, 755 of the embodiments of the invention shown in FIG. 7 to FIG. 11 can be provided with a ferromagnetic layer in otherwise identical embodiments or can be made without a ferromagnetic layer. The measurement membranes with a ferromagnetic layer enable on the one hand larger magnetic forces to be attained. On the other hand, as a result of the hysteresis in magnetization and as a result of small asymmetries with respect to the measurement membrane, they cause problems in the calibration of the pressure transducers.

Figure 12A:
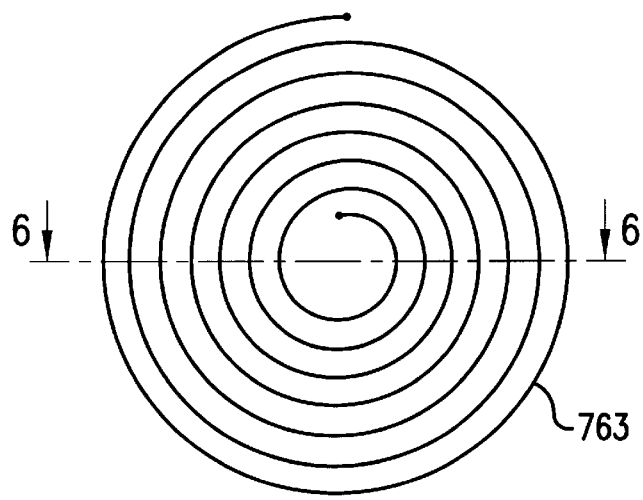
FIG. 12a shows a simplified partial plan view of another embodiment of a differential pressure transducer the invention.
Figure 12B:
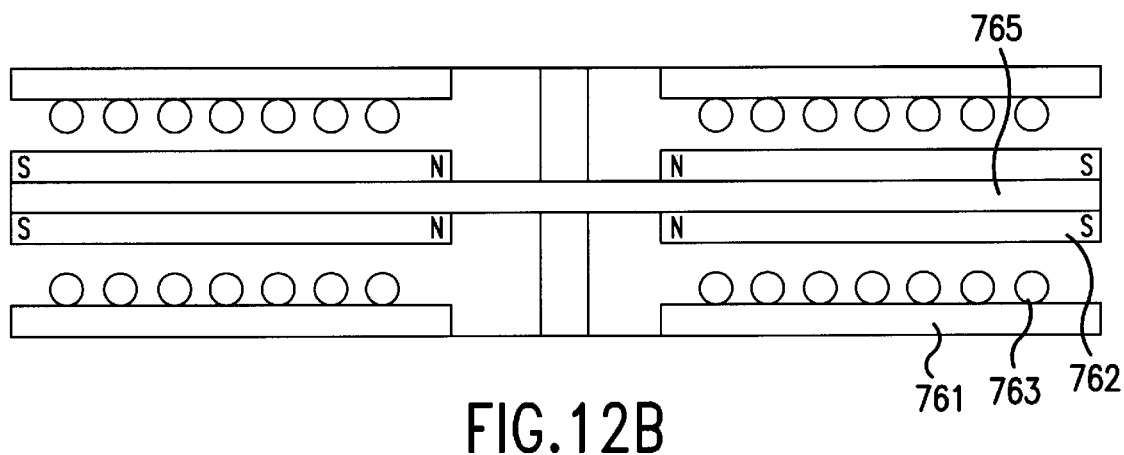

The electromagnet arrangement shown in FIGS. 12*a* and 12*b* is similar to the electromagnet arrangement shown in FIGS. 10*a* and 11*b*. In contrast to the electromagnet arrangement in FIG. 10 however in the electromagnet arrangement in FIG. 12 the coil 763 is located on the silicon annular carrier layer 761 which is applied to the housing bottom and the annular permanent magnetic layer 762 is attached to the measurement membrane 765.

Figure 13A:
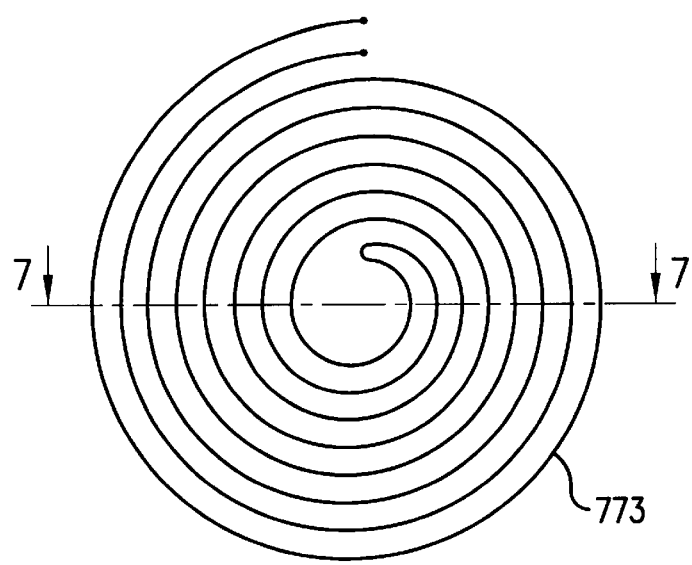
FIG. 13a shows a simplified partial plan view of another embodiment of a differential pressure transducer as claimed in the invention.
Figure 13B:
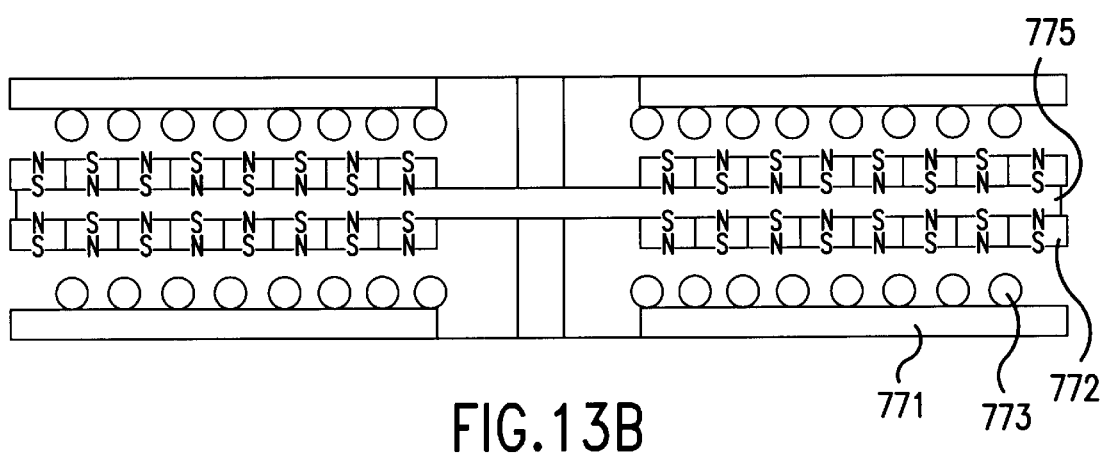

The electromagnet arrangement shown in FIGS. 13*a* and 13*b* is similar to the electromagnet arrangement shown in FIGS. 11*a* and 11*b*. In contrast to the electromagnet arrangement in FIG. 11 however in the electromagnet arrangement in FIG. 13 the coil 773 is located on the silicon annular layer 771 which is applied to the housing bottom, and the helical permanent magnetic layer 772 is attached to the measurement membrane 775.

Figure 14A:
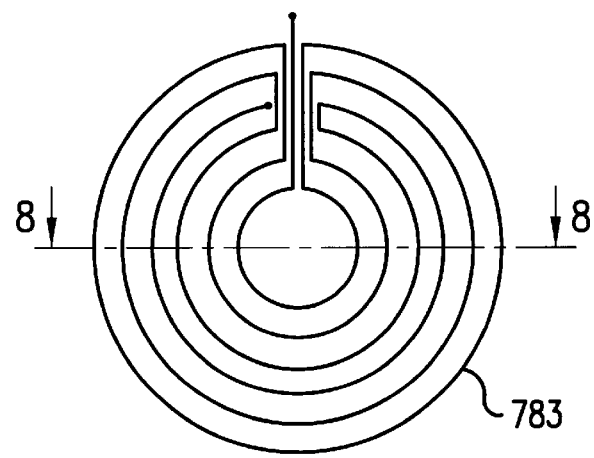
FIG. 14a shows a simplified partial plan view of another embodiment of a differential pressure transducer as claimed in the invention.
Figure 14B:
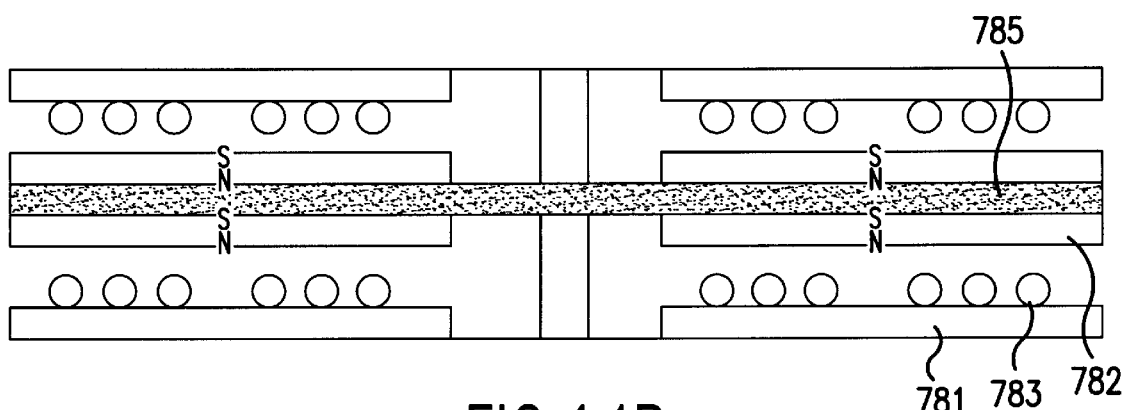

In the electromagnet arrangement shown in FIGS. 14*a* and 14*b*, on the annular silicon carrier layer 781 which is applied to the bottom of the housing there is a coil 783 which corresponds to the coil 703 which is shown in FIG. 7. The measurement membrane 785 is provided with a ferromagnetic layer. On its surface facing the bottom of the housing there is a ring magnet 782 corresponding to the ring magnetic 702 in FIG. 7.

Figure 15A:
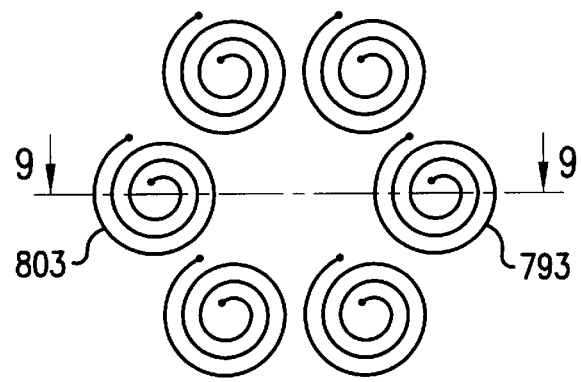
FIG. 15a shows a simplified partial plan view of another embodiment of a differential pressure transducer as claimed in the invention.
Figure 15B:
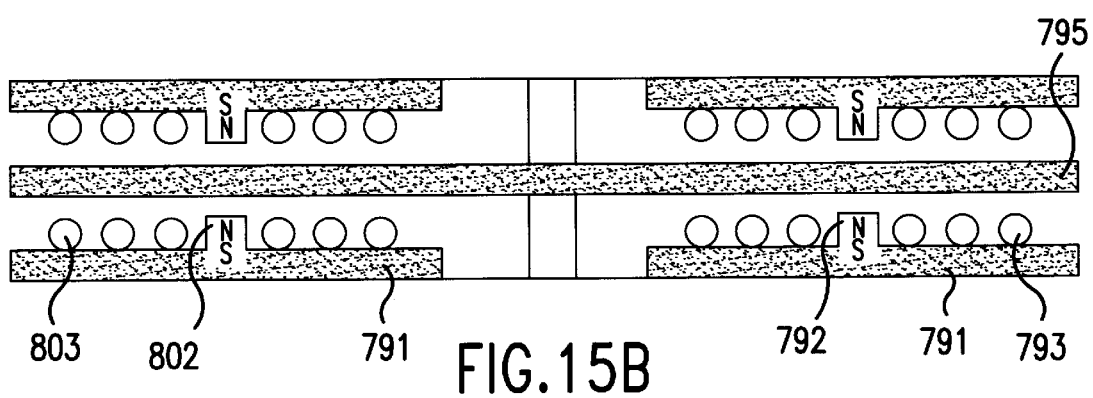

In the electromagnetic arrangement shown in FIGS. 15*a* and 15*b* on the annular ferromagnetic layer 791 which has been applied to the housing bottom there are six series-connected coils 793, 803 which correspond to the coils 723, 733 which are shown in FIG. 9. In the center of the six coils 793, 803 there is one permanent magnet 792, 802 each with a north pole N pointing towards the measurement membrane 795 and with a south pole S pointing towards the bottom of the housing. The measurement membrane 795 is provided with a ferromagnetic layer.

Figure 16A:
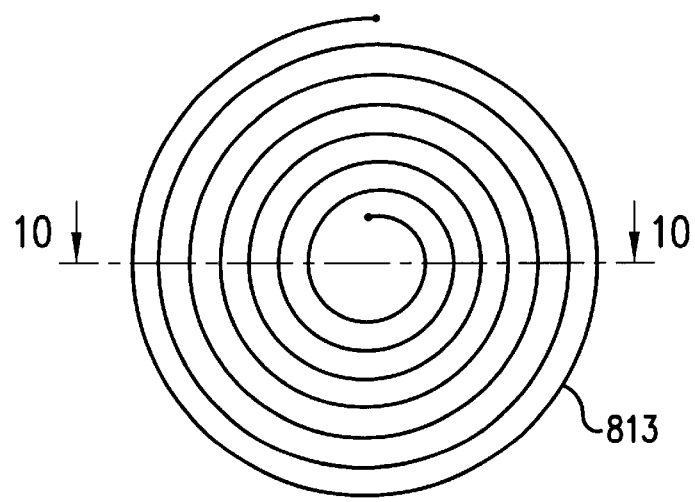
FIG. 16a shows a simplified partial plan view of another embodiment of a differential pressure transducer as claimed in the invention.
Figure 16B:
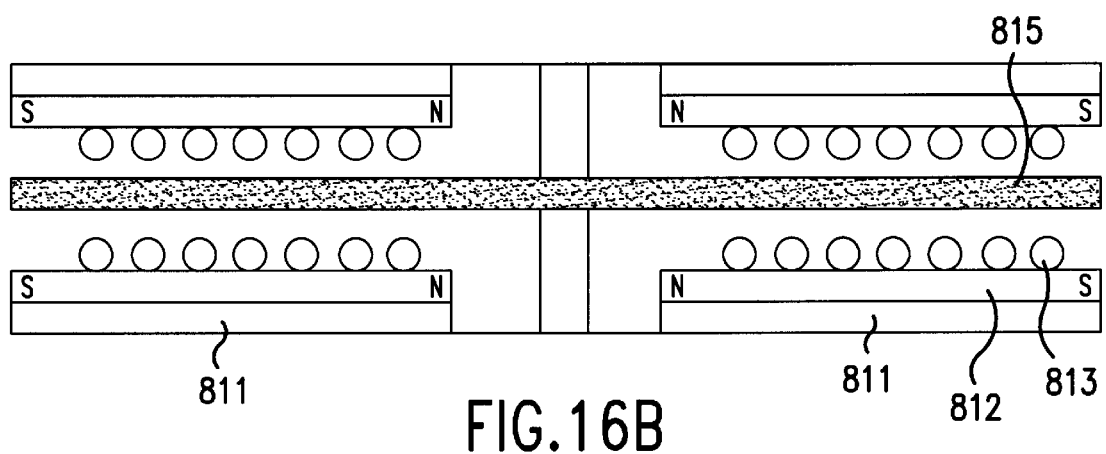

In the electromagnet arrangement which is shown in FIGS. 16*a* and 16*b* on the annular silicon layer 811 which has been applied to the bottom of the housing an annular permanent magnet 812 is applied with a north pole N pointing radially to the inside in a plane parallel to the measurement membrane 815 and with a south pole S pointing radially to the outside. On the ring magnet 812 there is a coil 813 which corresponds to the coil 743 which is shown in FIG. 10. The measurement membrane 815 us provided with a ferromagnetic layer.

Figure 17A:
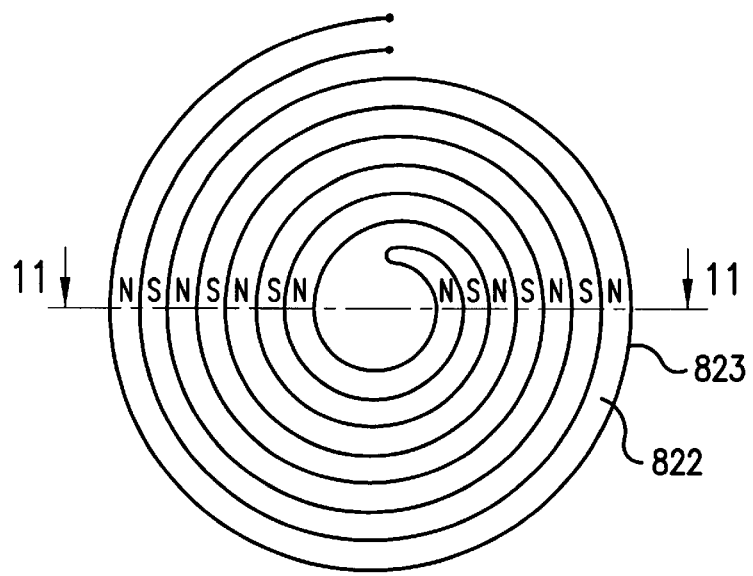
FIG. 17a shows a simplified partial plan view of another embodiment of a differential pressure transducer according to the invention.
Figure 17B:
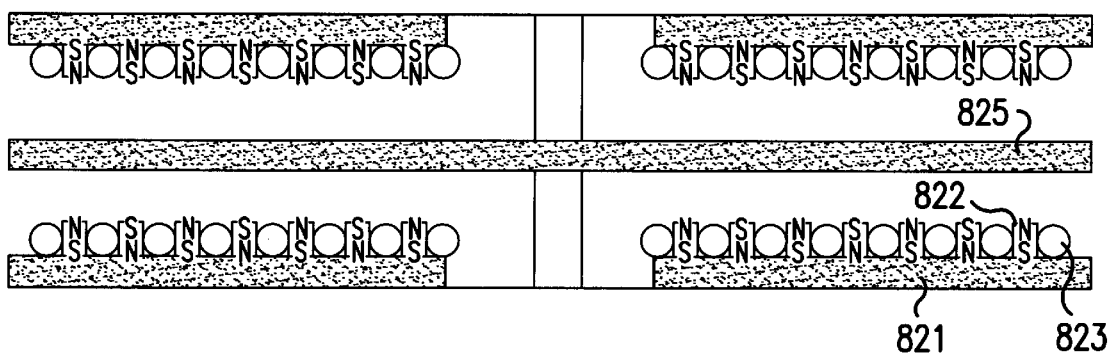

The electromagnet arrangement which is shown in FIGS. 17a and 17b comprises an annular ferromagnetic layer 821 which is located on the bottom of the housing. To this layer is applied a permanent magnetic layer 822 which has the form of a double strip and which is located helically on the ferromagnetic layer 821. In one strip of the double strip the north pole N is pointed towards the measurement membrane 825 and the south pole S is pointed towards the housing bottom, in the other strip of the double strip the north pole N is pointed towards the housing bottom and the south pole S is pointed towards the measurement membrane 825. Between the individual permanent magnetic strips on the ferromagnetic layer 821 there is furthermore a microengineering coil 823. The coil 823 which is shown in FIG. 17a in an overhead view is made as a helically arranged double turn. The two turn parts of the double turn are deeply connected to one another to conduct current in the center of the helix so that the current flows from the outside to the inside in succeeding turns in the opposite direction of rotation. The measurement membrane 825 is provided with a ferromagnetic layer.

In summary, it can be stated that the invention makes available a differential pressure transducer which has a simple structure, which can be produced economically in large series, which guarantees a long service life and which can be used under ambient conditions which are severe in terms of corrosion and temperature.

| Reference number list | |
|---|---|
| 100, 200, 300, 400, 600 | pressure transducer |
| 103, 203, 303, 403, 603 | housing cover |
| 104, 204, 304, 404, 604 | housing bottom |
| 106, 107, 206, 207, 306, 307, 406, 407 | spacers |
| 111, 112, 211, 212, 311, 312, 411, 412, 611, 612 | measurement space |
| 113, 114, 213, 214, 313, 314, 413, 414, 613, 614 | openings |
| 121, 122, 221, 222, 321, 322, 421, 422, 621, 622 | coils |
| 123, 124, 323, 324, 423, 424, 623, 624 | coil insulating frame |
| 129, 130, 229, 230, 329, 330, 429, 430 | coil arrangement protective layer |
| 150, 250, 350, 450, 550 | measurement membrane |
| 160, 660 | ferromagnetic layers |
| 170, 270, 370, 470 | magnetic means protective layer |
| 260, 360 | permanent magnet |
| 325, 326 | tunnel-like depressions |
| 327, 328 | recesses in the coil insulating frame |
| 460 | magnetic means coil |
| 500 | oscillator |
| 511 | resistor |
| 512 | resistor |
| 513 | resistor |
| 514 | resistor |
| 530 | operational amplifier |
| 542 | inverting input of the operational amplifier |

| -continued | |
|---|---|
| Reference number list | |
| 543 | output of the operational amplifier |
| 544 | noninverting input of the operational amplifier |
| 682, 684 | pressure pick-up membrane |
| 686, 688 | connecting part |
| 691, 692 | intermediate space |

What is claimed is:

1. A differential pressure transducer comprising
   a housing defining a chamber;
   said chamber comprising first and second measurement spaces that are exposed to first and second pressures;
   a measurement membrane;
   a first pressure pick-up membrane exposed to the first pressure, said first pick-up membrane being coupled to the measurement membrane by a solid coupling part to transfer force to said measurement membrane, the effective surface of the first pressure pickup membrane being different from the effective surface of the measurement membrane;
   said measurement membrane being deflected in response to a pressure differential between said first and second pressures;
   a deflection sensor producing a deflection signal responsive to said deflection;
   an electrical switching device generating a current responsive to the deflection signal;
   said transducer including an electromagnet device and magnetic means;
   one of said electromagnet device and said magnetic means being mounted on said housing and the other of said electromagnet device and said magnetic means being mounted on said measurement membrane;
   said current generating in said electromagnet device a magnetic field that exerts a non-contact magnetic force on said magnetic means and said measurement membrane which compensates for the deflection force resulting from the pressure differential;
   said current representing a measure of the differential pressure; and
   a measure of said current being output as an indication of the pressure differential.

2. A differential pressure transducer as claimed in claim 1, wherein the electromagnet device is symmetrical with respect to the plane which is defined by the measurement membrane.

3. A differential pressure transducer as claimed in claim 1, wherein said measurement membrane comprises a single membrane having one side thereof directly exposed to the first pressure and the other side thereof directly exposed to the second pressure.

4. A differential pressure transducer as claimed in claim 1, further comprising a second pressure pick-up membrane exposed to the second pressure and coupled to the measurement membrane for transferring force to the measurement membrane, the effective surface of the second pressure pick-up membrane being different from the effective surface of the measurement membrane.

5. A differential pressure transducer as claimed in claim 1, wherein the magnetic means comprises ferromagnetically soft material.

6. A differential pressure transducer as claimed in claim 1, wherein the magnetic means comprises permanent magnetic means of ferromagnetically hard material.

7. A differential pressure transducer as claimed in claim 1, wherein the magnetic means comprises electrically conductive material which acts as an electromagnet in a magnetic field which changes over time.

8. A differential pressure transducer as claimed in claim 1, wherein the switching device comprises a differential oscillator.

9. A differential pressure transducer comprising
a chamber;
said chamber comprising first and second measurement spaces that are exposed to first and second pressures;
a measurement membrane;
said measurement membrane being deflected in response to a pressure differential between said first and second pressures;
a sensor and compensating device for producing a deflection signal responsive to said deflection and for compensating for the deflection said sensor and compensating device comprising a same electromagnetic device and a same magnetic means,
wherein the same electromagnetic device is simultaneously a part of both of the sensor and compensating device and the same magnetic means is simultaneously a part of both of the sensor and compensating device.

10. A differential pressure transducer as in claim 9, further comprising a housing defining said chamber, wherein
said sensor and compensating device further comprises an electrical switching device;
one of said electromagnet device and said magnetic means being mounted on said housing and the other of said electromagnet device and said magnetic means being mounted on said measurement membrane;
said integral device generating a deflection signal responsive to relative movement of said magnetic means and said electromagnet device;
said switching device generating a current responsive to the deflection signal;
said current generating in said electromagnet device a magnetic field that exerts a force on said magnetic means and said measurement membrane which compensates for the deflection force resulting from the pressure differential.

11. A differential pressure transducer as claimed in claim 9, wherein the electromagnet device is symmetrical with respect to a plane which is defined by the measurement membrane.

12. A differential pressure transducer as claimed in claim 9, wherein said measurement membrane comprises a single membrane having one side thereof directly exposed to the first pressure and the other side thereof directly exposed to the second pressure.

13. A differential pressure transducer as claimed in claim 9, further comprising at least a first pressure pick-up membrane exposed to the first pressure, said first pressure pick-up membrane being coupled to the measurement membrane to transfer force to said measurement membrane, the effective surface of the first pressure pick-up membrane being different from the effective surface of the measurement membrane.

14. A differential pressure transducer as claimed in claim 13, further comprising a second pressure pick-up membrane exposed to the second pressure and coupled to the measurement membrane for transferring force to the measurement membrane, the effective surface of the second pressure pick-up membrane being different from the effective surface of the measurement membrane.

15. A differential pressure transducer as claimed in claim 10, wherein the magnetic means comprises ferromagnetically soft material.

16. A differential pressure transducer as claimed in claim 9, wherein the magnetic means comprises permanent magnetic means of ferromagnetically hard material.

17. A differential pressure transducer as claimed in claim 9, wherein the magnetic means comprises electrically conductive material which acts as an electromagnet in a magnetic field which changes over time.

18. A differential pressure transducer as claimed in claim 10, wherein the switching device comprises a differential oscillator.

19. A differential pressure transducer as claimed in claim 1, wherein said electromagnet device comprises a micro-engineered current carrying coil.

20. A differential pressure transducer as claimed in claim 9, wherein said electromagnet device comprises a micro-engineered current carrying coil.

21. A differential pressure transducer as claimed in claim 9, wherein the magnetic means is symmetrical with respect to a plane which is defined by the measurement membrane.

22. A differential pressure transducer as claimed in claim 10, wherein said electromagnet device is mounted on said housing and said magnetic means is mounted on said measurement membrane.

23. A differential pressure transducer as claimed in claim 10, wherein said magnetic means is mounted on said housing and said electromagnet device is mounted on said measurement membrane.

24. A differential pressure transducer as claimed in claim 1, wherein the magnetic means is symmetrical with respect to the plane which is defined by the measurement membrane.

25. A differential pressure transducer as claimed in claim 1, wherein said electromagnet device is mounted on said housing and said magnetic means is mounted on said measurement membrane.

26. A differential pressure transducer as claimed in claim 1, wherein said magnetic means is mounted on said housing and said electromagnet device is mounted on said measurement membrane.

* * * * *